(12) United States Patent
Bybee

(10) Patent No.: US 8,172,246 B2
(45) Date of Patent: May 8, 2012

(54) ADJUSTABLE BICYCLE FENDER ASSEMBLY

(75) Inventor: Eric Bybee, Waterloo, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 146 days.

(21) Appl. No.: 12/854,377

(22) Filed: Aug. 11, 2010

(65) Prior Publication Data

US 2012/0038127 A1    Feb. 16, 2012

(51) Int. Cl.
B62D 25/18    (2006.01)

(52) U.S. Cl. .......... 280/152.1; 280/152.3; 280/852; 280/157

(58) Field of Classification Search .......... 280/847, 280/152.1, 152.3, 848, 849, 851, 852, 156–157
See application file for complete search history.

(56) References Cited

U.S. PATENT DOCUMENTS

| | | | | |
|---|---|---|---|---|
| 515,213 | A | | 2/1894 | Griswold |
| 590,980 | A | * | 10/1897 | Hall ........................... 280/152.3 |
| 614,007 | A | * | 11/1898 | Kiddier ...................... 280/152.3 |
| 614,954 | A | * | 11/1898 | Jeffery ....................... 280/152.1 |
| 896,580 | A | | 8/1908 | Robeson et al. |
| 1,015,774 | A | * | 1/1912 | Barber ....................... 280/158.1 |
| 1,048,894 | A | * | 12/1912 | Schickel .................... 280/152.3 |
| 1,069,506 | A | * | 8/1913 | Wilson ....................... 280/152.1 |
| 1,112,478 | A | * | 10/1914 | Roderick ................... 280/152.3 |
| 1,352,596 | A | * | 9/1920 | Green ........................ 280/152.1 |
| 1,510,603 | A | * | 10/1924 | Pawsat ....................... 280/152.1 |
| 1,577,146 | A | * | 3/1926 | Pawsat ....................... 280/152.1 |
| 1,581,827 | A | * | 4/1926 | Beck, Jr. .................... 280/152.1 |
| 2,135,218 | A | * | 11/1938 | Pawsat ....................... 280/152.1 |
| 2,135,257 | A | * | 11/1938 | Manton ...................... 280/152.1 |
| 3,103,369 | A | * | 9/1963 | Gaines et al. ................... 280/63 |
| 4,129,317 | A | | 12/1978 | Bell |
| 5,026,083 | A | * | 6/1991 | Wendorf ........................ 280/277 |
| 5,120,073 | A | * | 6/1992 | Sealy, Jr. ................... 280/152.1 |
| 5,121,935 | A | | 6/1992 | Mathieu et al. |
| 5,165,712 | A | * | 11/1992 | Fuller ............................ 280/277 |
| 5,322,311 | A | | 6/1994 | Dunn |
| 5,562,296 | A | * | 10/1996 | Hall et al. .................. 280/152.3 |
| 5,695,206 | A | * | 12/1997 | Belka ......................... 280/152.1 |
| 5,716,070 | A | | 2/1998 | Pearson |
| 5,899,473 | A | * | 5/1999 | Mackenzie ................ 280/152.3 |
| 5,918,904 | A | | 7/1999 | Hanesworth |
| 6,199,883 | B1 | | 3/2001 | Gable |
| 6,367,832 | B1 | | 4/2002 | Vogel |

(Continued)

FOREIGN PATENT DOCUMENTS

CN    2494786    6/2002

(Continued)

Primary Examiner — J. Allen Shriver, II
Assistant Examiner — Erez Gurari
(74) Attorney, Agent, or Firm — Boyle Fredrickson, S.C.

(57) ABSTRACT

A fender mounting system that is particularly applicable to bicycles and that includes one or more adjustable strap assemblies that connect the fender to the bicycle. The strap assemblies include a first portion that is individually securable to the fender and a second portion that is individually securable to the underlying bicycle. A clamp assembly cooperates with the respective portions of the strap assembly so that the portions of the strap assembly bypass one another when the clamp assembly is loose to allow positioning of the fender relative to the wheel while the fender assembly is attached, albeit loosely, to the bicycle. Tightening of the clamp assembly fixes the position of the fender relative to an adjacent wheel.

20 Claims, 3 Drawing Sheets

U.S. PATENT DOCUMENTS

| | | | |
|---|---|---|---|
| 6,446,994 B1 * | 9/2002 | Smerdon, Jr. | 280/152.1 |
| 6,634,664 B1 * | 10/2003 | Kojima | 280/288.4 |
| 6,889,990 B2 * | 5/2005 | Simpson | 280/152.1 |
| 6,913,274 B2 | 7/2005 | Hsu | |
| 7,273,221 B2 | 9/2007 | Ockenden | |
| 7,625,012 B2 | 12/2009 | Hsu | |
| 7,669,798 B2 * | 3/2010 | Guering et al. | 244/121 |
| 7,976,041 B2 * | 7/2011 | Chuang | 280/152.1 |
| 2008/0290625 A1 | 11/2008 | Kuo-Chung | |
| 2009/0008920 A1 | 1/2009 | Laivins et al. | |
| 2010/0164195 A1 * | 7/2010 | Chuang | 280/152.1 |

FOREIGN PATENT DOCUMENTS

| | | |
|---|---|---|
| CN | 2628393 | 7/2004 |
| EP | 0349646 A1 | 1/1990 |
| EP | 1201533 A2 | 5/2002 |
| EP | 1201533 B1 | 12/2006 |
| EP | 1834866 A2 | 9/2007 |
| EP | 1852340 B1 | 4/2009 |
| EP | 2060479 A1 | 5/2009 |
| EP | 1867562 B1 | 8/2009 |
| GB | 2393166 B2 | 9/2004 |

* cited by examiner

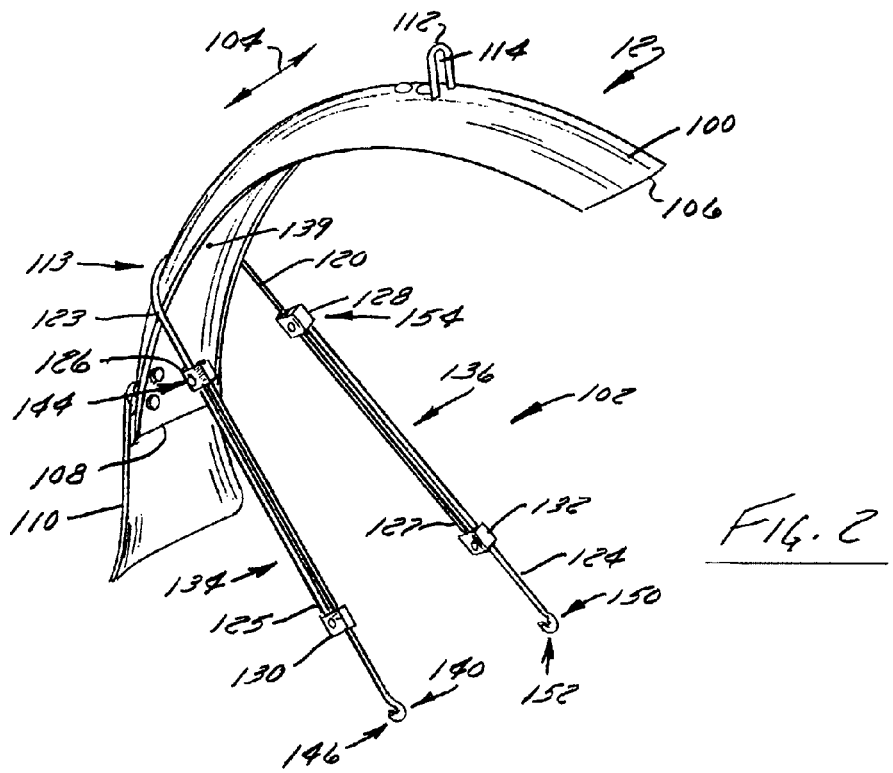

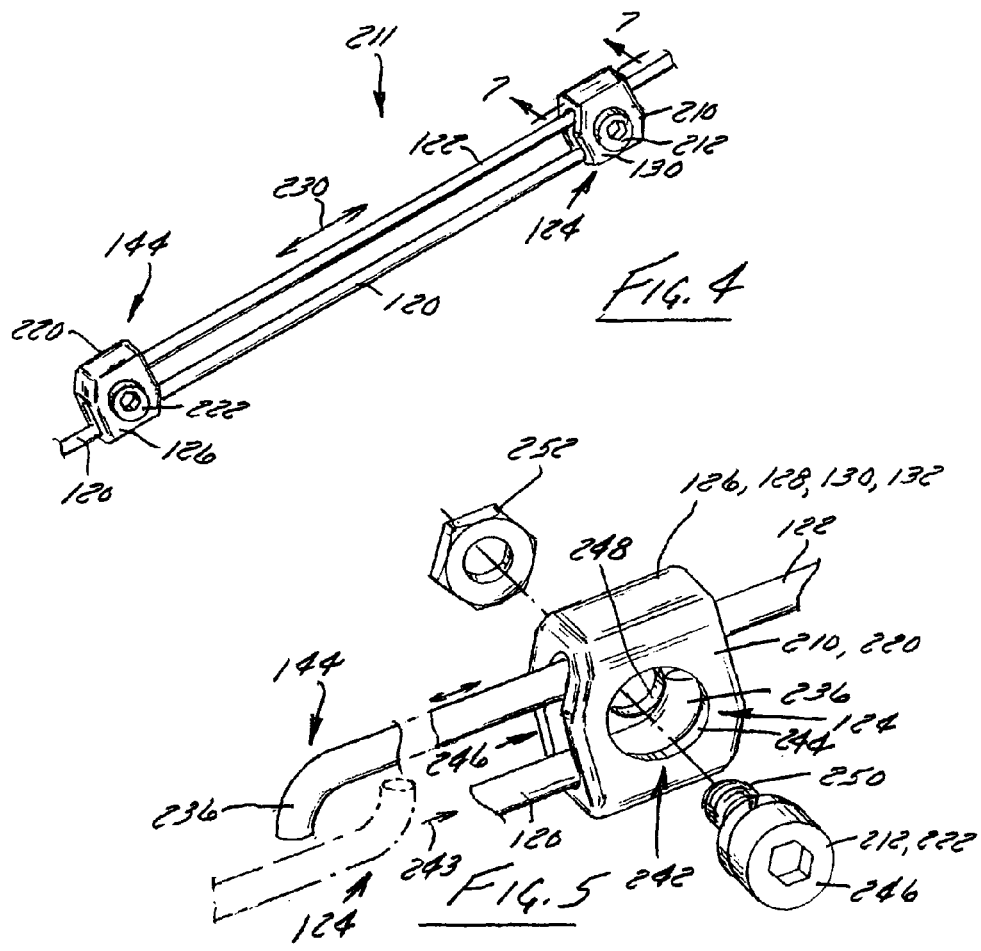
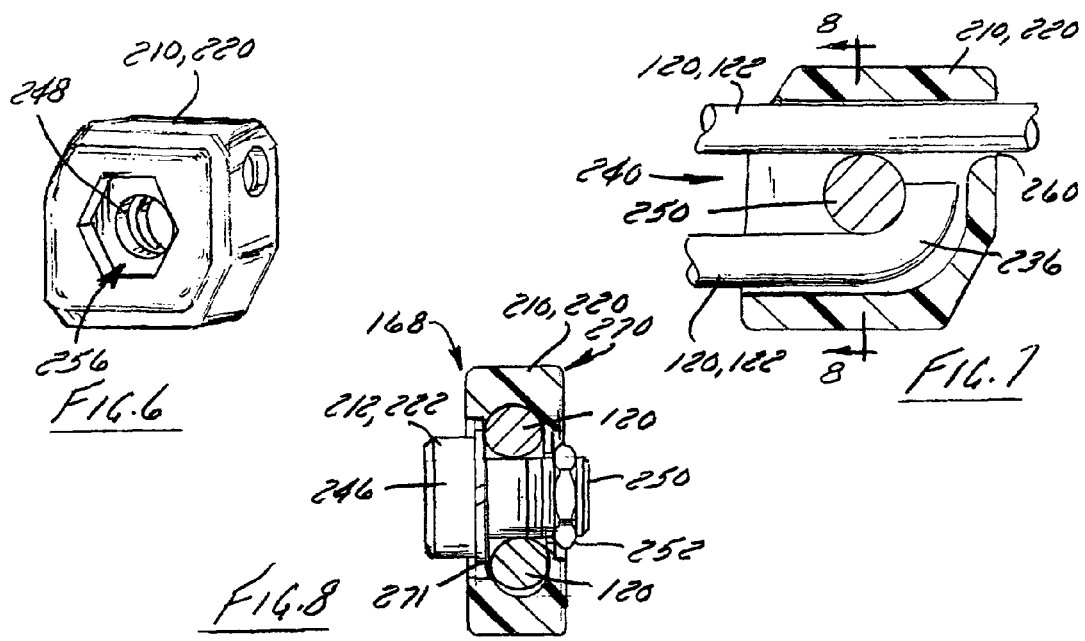

ADJUSTABLE BICYCLE FENDER ASSEMBLY

BACKGROUND OF THE INVENTION

The present invention relates generally to bicycles and, more particularly, to a fender assembly whose orientation can be adjusted relative to the underlying bicycle so as to maintain a generally concentric orientation of the fender with respect to an adjacent wheel.

With the every increasing popularity of bicycle riding, whether for fitness, recreation, or transportation, there is ever present pressure for the providing of bicycles that can be operated during periods of less than desirable riding conditions. Many riders are familiar with the undesirable effects of tire spray. Commonly, when a bicycle is riding over wet or dirty surfaces, debris accumulated through the interaction of the tire with the road or ground is propelled in radially outward directions from the tire as the tires rotate over the operating surface. Wet surfaces are known to be particularly problematic with respect to tire spray. The dirt and water propelled by operation of the bicycle wheels has a tendency to soil the bicycle, the rider, and the rider's clothes. A bicycle wheel fender is intended to mitigate the detrimental effects of such tire spray by deflecting the spray and debris in directions away from the rider and the bicycle. Although many bicycle fender systems are known, such systems are not without their respective drawbacks.

Many known fender systems are simply non-adjustable requiring the user to locate a fender system designed for their particular bicycle. Such systems create undue expenses on manufacturers in as much as such systems requiring a wide array of product offerings that vary by fender shape and connection modalities which correspond to only limit configurations of underlying bicycles. Still other fender systems provide a fender system that includes variable connection linkages and/or brackets to expand the range of bicycles to which the fender can be connected. Such systems are less than desirably environmental conscious in that the end user then simply discards extra mounting hardware that is inapplicable to the mounting of the fender to the bicycle of the given user.

Still others provide adjustable fender assemblies but such systems also include a number of disadvantages. One such system includes a number of rail members that extend in a radially outward direction from the bicycle and cooperate with the fender assembly. To attain a desired position and orientation of the fender, the use must individually adjust a number of nuts or bolts that secure the rails to the fender. Such connections are also dispersed along a substantial portion of the area of the fender. The non-adjacent positioning and concurrent manipulation required of each connection point detracts from the adjustably of the fender system in that any adjustment of the fender commonly requires a first person to maintain a desired position of the fender and a second person to manipulate the various fasteners.

Although such systems can be configured to provide a desired orientation of the fender relative to the underlying tire by a single operator, such manipulation is commonly time consuming as well as frustrating. Commonly, manipulation of one support connection requires manipulation of additional support connections to attain a desired orientation of the fender relative to the tire. Many users, recognizing such difficulties, fully assemble the fender and mounting system prior to mounting the fender system to the underlying bicycle. Unfortunately, the fairly fixed orientation of the fender assembly prior to connecting the same to the bicycle often achieves a less than desired positioning and orientation of the fender when the assembly is connected to the bicycle.

Such systems also commonly suffer from another drawback. Commonly, such adjustable fender support systems include a number of members that extend in an outward direction relative to the fender and/or the bicycle. Commonly, these extending members are formed of a rigid material, such as metal, and are generally shaft shaped. Although these extensions are necessary to facilitate the cooperation of the fender assembly with a number of bicycle constructions, they can also undesirably snag or piece materials or structures that pass in close proximity to the fender.

Therefore, there is a need for a bicycle fender system and mounting arrangement that can be conveniently configured to cooperate with any of a number of bicycle shapes. There is a further need for a bicycle fender system that can be conveniently and expeditiously adjusted when attached to the underlying bicycle to attain the desired orientation of the fender relative to the bicycle with limited manipulation of the various connections associated with supporting the fender.

BRIEF DESCRIPTION OF THE INVENTION

The present invention provides a bicycle fender and fender mounting systems that overcomes one or more of the aforementioned drawbacks. In one aspect, a fender mounting system is disclosed that is particularly applicable to bicycles and that includes one or more adjustable strap assemblies that connect the fender to the bicycle. The strap assemblies include a first portion that is individually securable to the fender and a second portion that is individually securable to the underlying bicycle. A clamp assembly cooperates with overlapping portions of the strap assembly so that the first and second portions of the strap assembly can bypass one another when the clamp assembly is loose and define a position of the fender relative to a bicycle when the clamp assemblies are tightened. The strap assemblies allow positioning of the fender relative to the wheel while the fender assembly is attached, albeit loosely, to the bicycle and fix the position of the fender relative to an adjacent wheel when the strap assemblies are secured.

Another aspect of the invention that is usable with one or more of the aspects described above discloses a bicycle fender assembly having a fender body that is shaped to be positioned radially outward and circumferentially about a portion of a bicycle wheel. A strut is attached to the fender and is oriented to extend in a radially inward direction from the fender body. A mount arm is removably secured to a bicycle and is oriented to bypass the strut. The fender assembly includes a clamp body having a first portion and a second portion. The first portion of the clamp body is positioned on a first side of the mount arm and the strut and the second portion of the clamp body is positioned on a second side of the mount arm and the strut so as to be opposite the first portion. The assembly includes a fastener that passes through one and operatively engages the other of the first portion and the second portion of the clamp body. Tightening of the fastener captures the strut and the mount arm relative to the first portion and the second portion of the clamp body and fixes a radial position of the fender body with respect to the bicycle wheel.

Another aspect of the invention that is useable with one or more of the aspects described above discloses a bicycle fender assembly having a strap attached to the fender. The strap has a first end and a second end that extend in an inward radial direction from opposite lateral sides of the fender. A first mount shaft and a second mount shaft, that each include a first end secured to a bicycle so that the mount shafts flank a wheel, extend in an outward radial direction toward the strap so that the first mount shaft overlaps the first end of the strap and the second mount shaft overlaps the second end of the strap. A first clamp assembly is engaged with the first mount shaft and the strap and a second clamp assembly is engaged with the second mount shaft and the strap. Each clamp assembly is adjustable so that the respective mount shaft and strap can bypass one another when the clamp assembly is loose and fix a position of the strap relative to the respective mount shaft when the clamp assembly is tightened.

A further aspect of the invention that can be combined with one or more of the aspects described above discloses a method of mounting a fender relative to a bicycle wheel. The method includes positioning a mount arm along alternate ends of a strap attached to a fender. A clamp is engaged with each mount arm and the strap so that each mount arm and strap are loosely attached to one another and can bypass one another in a direction generally aligned with a longitudinal axis of the strap and the respective mount arm. The distal end of each mount arm is secured to alternate sides of a bicycle so that the mount arms and at least a portion of the alternate ends of the strap flank the bicycle wheel. The fender is positionable in a radial direction relative to the wheel to alter an overlap length of the strap and the respective mount arm so that, when the clamp is adjusted to compress the strap and the respective mount arm between the clamp and a fastener, cooperation of the strap and mount arms defines the overlap length with the fender in a desired position about the bicycle wheel.

In a preferred aspect of the invention that is useable with one or more of the above aspects, the fender assembly includes more than one strap and mount arm association that cooperate with the fender to support the fender at various locations along the longitudinal length of the fender. Preferably, the multiple straps and mount arm pairs are oriented in a generally radially pattern. It is further preferred that the strap and mount arm assemblies be arranged in generally mirrored configurations on the alternate lateral sides of the wheel assembly.

In another preferred aspect the clamp assemblies are configured to cooperate with an end of one of the mount arm and the strap. More preferably, multiple clamp assemblies are provided and oriented so that a clamp assembly is engaged with an end of each of the strap and the mount arm that overlaps the other of the strap and the mount arm.

It is further preferred that each clamp assembly be configured to capture an end of the respective strap and mount arm so the that clamp moves with the respective elongated member as the end of the respective elongate member is translated in the longitudinal direction relative to the adjacent elongated member. More preferably, each clamp, strap, and mount arm association are configured to cooperate with one another in a manner that allows restrained but unsecured mounting of the fender such that, when connected but unsecured, the user can manually manipulate the position and orientation of the fender, strap(s), and mount arm(s) relative to the bicycle or wheel while the interaction of the strap(s), mount arm(s), and clamp assembly(ies) provide sufficient support to maintain the position and orientation of the fender, strap(s), and mount arm(s) without user interaction even though the clamp assembly is not fully tightened. Preferably, tightening of the clamp assembly(ies) fixes the position and orientation of the fender, strap(s), and mount arm(s) relative to the bicycle. Preferably, the fender mounting and fender systems of the present invention are applicable for use about one or both of a front wheel and a rear wheel of a bicycle.

It is appreciated that the aspects and features of the invention summarized above are not limited to any one particular embodiment of the invention. That is, many or all of the aspects above may be achieved with any particular embodiment of the invention. Those skilled in the art will appreciate that the invention may be embodied in a manner preferential to one aspect or group of aspects and advantages as taught herein. These and various other aspects, features, and advantages of the present invention will be made apparent from the following detailed description and the drawings.

BRIEF DESCRIPTION OF THE DRAWINGS

The drawings illustrate preferred embodiments presently contemplated for carrying out the invention.

FIG. 2 is forward perspective view of the front fender assembly shown in FIG. 1 removed from the bicycle;

FIG. 3 is a view similar to FIG. 2 and shows the rear fender assembly shown in FIG. 1;

FIG. 4 is a perspective view of a center portion of a radial support assembly of either of the front or rear fender assemblies shown in FIGS. 2 and 3;

FIG. 5 is perspective exploded view of one of the clamp assemblies shown in FIG. 4 with the elongated radial supports extending therethrough;

FIG. 6 is a perspective view of a clamp body of the clamp assembly shown in FIG. 5;

FIG. 7 is cross sectional view of one of the clamp assemblies according to the present invention and taken along line 7-7 shown in FIG. 4; and FIG. 8 is a cross sectional view of one of the clamp assemblies according to the present invention taken along line 8-8 shown in FIG. 7.

DETAILED DESCRIPTION OF THE PREFERRED EMBODIMENT

Figure 1:
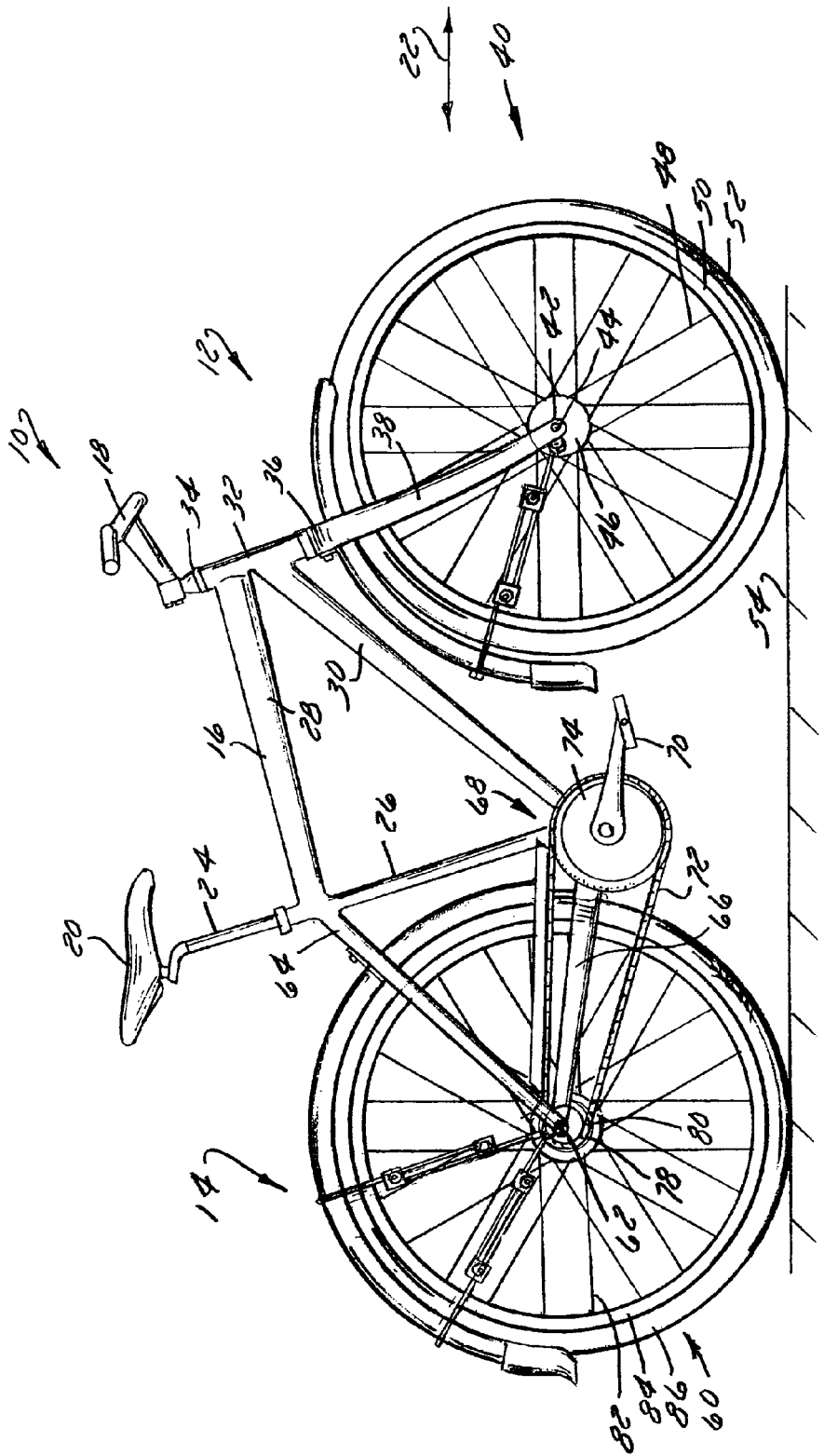
FIG. 1 is an elevation view of a bicycle equipped with front and rear fender assemblies according to the present invention.

FIG. 1 shows a bicycle 10 equipped with a forward fender assembly 12 and a rear fender assembly 14 according to the present invention. Fender assemblies 12, 14 are attached at a number of locations to a frame 16 or other non-moving structures of bicycle 10, such as the stays. Bicycle 10 includes handlebars 18 that are attached to frame 16 generally forward of a seat 20 relative to a longitudinal axis, indicated by arrow 22, of bicycle 10. A seat post 24 extends in a downward direction from seat 20 and slidably or telescopically engages a seat tube 26 of frame 16. Frame 16 includes a top tube 28 and a down tube 30 that extend forward from seat tube 26 to a head tube 32 that connects the generally forward ends of top tube 28 and down tube 30.

Handlebars 18 are connected to a stem 34 that passes through head tube 32 of frame 16. Stem 34 is secured to a fork crown 36. A pair of forks 38 extend from generally opposite lateral ends of fork crown 36 and support a front wheel assembly 40 at an end of the forks or fork tips 42. Fork tips 42 support generally opposite lateral sides of an axle 44 that engages a hub 46 of front wheel assembly 40. A number of spokes 48 extend between hub 46 and a rim 50 of front wheel assembly 40. A tire 52 is engaged with rim 50 such that tire 52, rim 50, and hub 46 rotate relative to forks 38 as tire 52 rotates over ground surface 54. Front fender assembly 12 is positioned radially outward of front wheel assembly 40 and extends about a portion of the circumference, and in generally close proximity to, front wheel assembly 40. Preferably, front fender assembly 12 has a longitudinal length that is sufficient to deflect road debris or spray attributable to operation of the front wheel assembly 40 in directions away from a rider or the remainder of bicycle 10.

Bicycle 10 includes a rear wheel assembly 60 that is positioned radially inward relative to the curvature of rear fender assembly 14. Rear wheel assembly 60 is preferably positioned concentrically about a rear axle 62 such that rear wheel assembly 60 rotates about rear axle 62. Bicycle frame 16 includes a seat stay 64 and a chain stay 66 that offset rear axle 62 from a crankset 68. Crankset 68 includes a set of pedals 70 that are operably connected to a flexible drive member, such as a chain 72, via one or more variable diameter chain ring or sprocket gears 74. Rotation of chain 72 communicates a drive force to a gear cluster 78 that is positioned at a rear section of bicycle 10 and attached to rear wheel assembly 60. Gear cluster 78 is generally concentrically orientated with respect to rear axle 62 and can also include one or more variable diameter gears.

Gear cluster 78 is operationally connected to a hub 80 of rear wheel assembly 60. Rear wheel assembly 60 includes hub 80, a number of spokes 82, a rim 84, and a rear tire 86. Each of the number of spokes 82 extend between hub 80 and rim 84 and communicate the loading forces therebetween. As is commonly understood, rider operation of pedals 70 drives chain 72 thereby driving rear wheel assembly 60 which in turn propels bicycle 10. Like front fender assembly 12, rear fender assembly 14 is positioned in a radially outward direction relative to rear wheel assembly 60 and has a generally curvilinear longitudinal shape that extends about a portion of a circumference of rear wheel assembly 60. Rear fender assembly 14 is positioned to deflect road debris or spray that is accelerated by the operation of rear tire 86 in directions away from a rider and bicycle 10. It should be readily apparent that bicycle 10 is shown as what is commonly understood as a road bike or bicycle configured for operation primarily on paved surfaces. However, it is further appreciated that fender assemblies 12, 14 are applicable to other bicycle configurations such as off-road or mountain bikes. It is appreciated that fender assemblies 12, 14 are applicable across various bicycle configuration platforms.

Those skilled in the art will appreciate that, regardless of the use-specific configuration of bicycle 10, during operation of bicycle 10, road debris and spray is expelled from the front and rear tires 52, 86 in a generally radially outward direction due to centripetal forces associated with rotation of the corresponding tire. Fender assemblies 12, 14 mitigate the undesirable effects, such as soiling of the bicycle and/or rider clothing and/or damage or injury that can be caused by flying solid debris, such as gravel, by redirecting such materials in directions generally away from the rider and/or the structures of the bicycle. Preferably, fender assemblies 12, 14 are oriented to be concentric with respect to the underlying wheel and in generally close proximity to the wheel without interfering with operation of wheel. It is appreciated that positioning fender assemblies 12, 14 in generally close proximity to the underlying wheel assembly provides a larger area of debris protection in that more debris directed in laterally canted radially outward directions from the wheel can be deflected and/or captured by the fender assembly. Said in another way, the close proximity of the respective fender assembly to the underlying wheel assembly allows the fender assembly to deflect/redirect road debris or spray having a greater lateral directional vector. As used herein, the lateral directions refer to the direction vectors that are oriented to cross the longitudinal axis 22 of bicycle 10. Such directions are commonly referred to the left and right sides of bicycle 10 as determined by a rider positioned for operation of the bicycle.

FIGS. 2 and 3 show forward and rear fender assemblies 12, 14 removed from bicycle 10. Referring to FIG. 2, forward fender assembly 12 includes a fender body 100 and an adjustable support assembly 102 that is connected thereto. Fender body 100 has a generally curvilinear elongated shape and is constructed to be positioned circumferentially about an underlying wheel. Fender body 100 is also curved in a radially inward direction with respect to a lateral axis, indicated by arrow 104, of body 100. Forward fender body 100 includes a forward facing end 106 and a rearward facing end 108. Preferably, an optional flap or extension 110 is secured to rearward facing end 108 of fender body 100. A bracket or tang 112 is attached to fender body 100 and extends in an outward radial direction relative to fender body 100. Preferably, tang 112 is secured at the lateral centerline of fender body 100. Tang 112 includes a passage or opening 114 and is constructed to provide a first connection of fender body 100 with the corresponding bicycle. Preferably, as shown in FIG. 1, tang 112 is constructed to be secured to fork crown 36 although tang 112 could extend in other directions so as to cooperate with other structures of the bicycle such as the forks of the down tube of the bicycle frame.

Still referring to FIG. 2, adjustable support assembly 102 is also secured to fender body 100. Adjustable support assembly 102 is offset from tang 112 along the longitudinal length of fender body 100. Adjustable support assembly 102 includes a strap 120, a first and a second mount arm 122, 124, and a number of clamp assemblies 126, 128, 130, 132. Strap 120 includes a generally elongated body 123 that extends between a first end 125 and a second end 127 of the strap 120. First end 125 of strap 120 is engaged with clamp assembly 130 and second end 127 of strap 120 is engaged with clamp assembly 132. As shown in FIG. 2, strap 120 includes a first portion 134 and a second portion 136 that both extend in a generally radial direction along generally opposite lateral sides of the underlying wheel. Strap 120 includes a middle portion 138 that connects first portion 134 and second portion 136. Middle portion 138 is curved to generally match the lateral curvature of fender body 100. One or more connectors 139 secure middle portion 138 of strap 120 to fender body 100. Although strap 120 is shown as having a generally continuous body 122 between first end 125 and second end 127, it is appreciated that strap 120 could be provided as multiple distinct parts that are independently securable to fender body 100 and extend in a radially inward direction relative thereto.

Still referring to FIG. 2, first mount arm 122 includes a first end 140 and a second end 144. First end 140 of mount arm 122 includes a hook 146 that is constructed to secure mount arm 122 relative to the underlying bicycle at a position proximate fork tip 42 as shown in FIG. 1. It is appreciated that the radially inward end of mount arms 122, 124 could be secured to the bicycle at locations offset from fork tips 42. As described further below with respect to FIGS. 4-8, first mount arm 122 and first portion 134 of strap 120 cooperate with clamp assemblies 126, 130 so that first mount arm 120 and first portion 134 of strap 120 can bypass one another when clamp assemblies 126, 130 are not tightened.

Still referring to FIG. 2, second mount arm 124 has a substantially similar construction as first mount arm 122. It is envisioned that mount arms 122, 124 be interchangeable with respect to the alternate lateral sides of the adjustable support assembly 102 disclosed herein. Second mount arm 124 includes a first end 150 having a hook 152 formed thereat and a second end 154 constructed to be captured by clamp assembly 128. Clamp assemblies 126, 128, 130, 132 cooperate with strap 120 and mount arms 122, 124 so that adjustable support assembly 102 can be loosely positioned relative to the underlying wheel and securely positioned relative thereto upon tightening of one or more of the respective clamp assemblies as described further below.

FIG. 3 shows rear fender assembly 14 removed from bicycle 10. Rear fender assembly 14 includes a fender body 160 having a generally curvilinear elongated shape that is also curved in the lateral direction similar to front fender body 100 as described above with respect to FIG. 2. Rear fender body 160 includes a forward end 162 and a rearward end 164. Forward end 162 of fender body 160 includes a bracket or a tang 166 for securing forward end 162 to the underlying bicycle. Tang 166 preferably includes one or more openings 168 associated with providing robust support of the forward end 162 of rear fender body 160 via the use of optional fasteners or the like. As shown in FIG. 1, tang 166 is configured to cooperate with the chain stays 66 of bicycle 10. It is understood that forward end 162 of rear fender body 160 could also be secured to seat tube 26, the bottom bracket of the bicycle frame, or seat stays 64 were fender body 160 to terminate more proximate such structures.

Rear fender assembly 14 also preferably includes an intermediate mount 170 that is positioned along the longitudinal length of fender body 160. Intermediate mount 170 also includes a tang 172 that extends in a radially outward direction relative to fender body 160. Tang 172 includes an opening 174 configured to facilitate securing intermediate mount 170 to the underlying bicycle. Preferably, intermediate mount 170 is contoured to generally match the lateral curvature of fender body 160. Intermediate mount 170 can be secured to fender body 160 in a number of ways including crimping alternate ends 176, 178 of intermediate mount body about the lateral sides 180, 182 of fender body 160 and/or providing a fastener, such as a rivet, or other connection between intermediate mount 170 and fender body 160.

Unlike front fender assembly 12 which includes a single adjustable support assembly 102, rear fender assembly 14 includes a pair of adjustable support assemblies 190, 192 that are splayed to extend in different radial directions relative to the longitudinal curvature of fender body 160 and the underlying bicycle. It should be understood that each of front fender adjustable support assembly 102 and each of rear fender adjustable support assemblies 190, 192 have substantially similar constructions and operate in similar manners. Each of rear fender adjustable support assemblies 190, 192 include a strap 120, first and second mount arms 122, 124 and a respective set of clamp assemblies 126, 128, 130, 132. Each clamp assembly 126, 128, 130, 132 is engaged within a respective end of a strap 120 or a mount arm 122, 124 and slidably cooperates with a corresponding and adjacent strap 120 or mount arm 122, 124.

Still referring to FIG. 3, a fastener 200 secures each strap 122 to rear fender body 160. It is appreciated that each strap 122 may be secured to fender body 160 in any of a number of manners including crimped connections, frictions interactions, and/or with non-operable fasteners such as rivets. Each adjustable support assembly 190, 192 extends from the opposite lateral sides of fender body 160 in a radially inward direction toward a more radially center region and terminates at radially inward ends 202, 204 of adjustable support assemblies 190, 192. Ends 202, 204 are constructed to be secured to bicycle 10 proximate rear axle 62 as shown in FIG. 1 but it is appreciated that ends 202, 204 could be secured to either of seat stays 64, chain stays 66 and/or other structures that are positionally fixed with respect to bicycle frame 16. It is further appreciated that although second ends 202, 204 of adjustable support systems 190, 192 are shown as being generally concentrically oriented with respect to one another, second ends 202, 204 of adjustable support systems could be secured at different positions relative to bicycle frame 16.

Although, FIG. 4 shows a bypassing portion 211 of only the left hand side of adjustable strap or support assembly 190 shown in FIG. 3, it should be understood that bypassing portion 211 is indicative of the bypassing orientation of each lateral side of each of adjustable support assemblies 102, 190, 192. As shown in FIGS. 4-8, clamp assembly 130 includes a clamp body 210 and a fastener 212 that cooperates with clamp body 210. End 125 of strap 120 is captured by clamp assembly 130. Clamp assembly 126 also includes a clamp body 220 and a fastener 222. Clamp assembly 126 captures an end 144 of mount arm 122. Prior to tightening of fastener 222, clamp assembly 126 slidably cooperates along the longitudinal length of strap 120. In a similar manner, prior to tightening of fastener 212 of clamp assembly 130, clamp assembly 130 slidably cooperates along the longitudinal length of mount arm 122. As indicated by arrow 230, prior to tightening of fasteners 212, 222, strap 120 and mount arm 122 are positionally oriented with respect to one another but adjustably connected such that the overall combined length of a respective lateral side of strap 120 and corresponding mount arm 122 can be adjusted. Said in another way, the ends of each of strap 120 and mount arm 122 are moveable relative to one another such that the length of each strap/mount arm association can be independently adjusted.

As shown in FIG. 5, each end 125, 144 of each strap 120 and each mount arm 122 of each adjustable support assemblies 102, 190, 192 that cooperates with a clamp assembly includes a curved end 236 that is shaped to pass into a pocket 240 of each respective clamp body 210, 220. Each clamp body 210, 220 includes a passage 242 that is oriented in a crossing direction relative to pocket 240. Passage 242 includes a laterally outboard facing opening 244 that is larger than a head portion 246 of a corresponding fastener 212, 222. Passage 242 includes a second opening 248 that is sized to receive a threaded shaft 250 of the respective fastener 212, 222. A nut 252 engages threaded shaft 250 so as to connect fastener 212, 222 relative to clamp body 210, 220. Alternatively, it is understood that opening 248 could b configured to directly engage shaft 250 of fastener 212, 222.

As shown in FIG. 6, clamp body 210, 220 includes a cavity 256 formed about opening 248. Cavity 256 is preferably shaped to at least partially receive nut 252. The interaction between nut 252 and cavity 258 allows the user to manipulate the axial position of fastener 212, 222 relative to clamp body 210, 220 without direct user interaction with nut 252. As cavity 256 faces in a laterally inward direction with respect to bicycle 10 when the adjustable support assemblies 102, 190, 192 are attached thereto, such a construction allows the user to manipulate fasteners 212, 222 without positioning any tools or other holding device on the laterally inboard side of the respective clamp assembly 126, 128, 130, 132.

As shown in FIG. 7, each clamp body 210, 220 includes a pocket 240 that is shaped to received the hook or curved end 236 of one of strap 120 or mount arm 122 and slidably cooperate with the elongate shape of the adjacent other of the strap 120 or mount arm 122. An arrow 243, shown in FIG. 6, indicates the insertion direction of strap 120 into pocket 240. Once fastener 212, 222 is engaged with clamp body 210, 220, the geometry of the clamp body 210, 220, the fastener 212, 222, and the hook 236 prevents disengagement of the elongate member from the clamp body 210, 220 regardless if nut 252 is engaged with the fastener 212, 222.

Referring back to FIG. 7, a shaft opening 260 is formed through a side of clamp body 210, 220 that is generally opposite the open end of pocket 240. Shaft opening 260 slidably receives a respective strap or mount arm 120, 222 passed therethrough. Opening 260 is shaped to allow the curved end 236 of the respective strap or mount arm 120, 222 to pass through clamp body 210, 220 from the direction opposite direction 243 (FIG. 6) and toward the second clamp assembly 126, 128, 130, 132 associated with the respective strap and mount arm pair 120, 220 of each of the adjustable support assemblies 102, 190, 192. Such a construction provides an adjustable fender support assembly wherein each clamp is slidable with respect to one of the strap and the mount arm and secured relative to an end of the other of the strap and the mount arm.

Referring to FIGS. 7 and 8, shaft 250 of each fastener 212, 222 passes between the strap 120 and mount arm 122 engaged with the respective clamp assembly 126, 128, 130, 132. As shown in FIG. 8, head portion 246 of fastener 212, 222 passes through a first portion 268 of clamp body 210, 220 and is engaged with a second portion 270 of clamp body 210, 220 via interaction with nut 252. Head portion 246 of fastener 212, 222 may include an optional washer 271 that increases the compression area associated with head portion 246 of the respective fastener 212, 222. When strap 120 and mount arm 122 are engaged with clamp body 210, 220, the cooperation of the strap and the mount arm with the passages of clamp body 210, 220 aligns the longitudinal axis of each strap and mount arm relative to one another. When fastener 212, 222, is loosely engaged with the respectively clamp assembly 126, 128, 130, 132, the respective strap 120 and mount arm 122 are loosely secured to the clamp assembly 126, 128, 130, 132 so that the length of the adjustable support assembly 102, 190, 192 can be adjusted to attain a desired orientation of the respective fender body 100, 160 relative to the underlying wheel. When the desired orientation is achieved, tightening of fastener 212, 222 captures the respective strap 120 and mount arm 122 between head 246 of the respective fastener 212, 222 and second portion 270 of the respective clamp body 210, 220 and thereby defining the radially length of the respective adjustable strap assembly 102, 190, 192.

During connection to a bicycle, each of front and rear fender assemblies 12, 14 can be loosely assembled so that the radially inward end of each mount arm is translatable relative to the corresponding strap. The bi-directional interaction between each strap 120, mount arm 122 and corresponding clamp assembly 126, 128, 130, 132 allows the fender support assembly to be connected to the bicycle in any number of ways. The mount arms can first be connected to the bicycle and then positioned for interaction with the strap portions and clamp assemblies or the fender support assemblies can be loosely assembled and then positioned with respect to the bicycle. After each of the connections of the fender assembly and the underlying bicycle frame are loosely established, the position of the fender can be manipulated to a desired orientation relative to the adjacent wheel and each clamp assembly subsequently secured so as to fix the position of the fender assembly relative to the bicycle. It is appreciated that each clamp assembly can be adjusted so as to provide a frictional but moveable interaction between the members of the adjustable support assemblies so that a user can manipulate the position of the fender relative to the bicycle but enough frictional interaction is provided to temporarily maintain the position of the fender even though none of the clamp assemblies are fully secured. Such interaction frees both the user hands for individual manipulation of the fender body and/or operation/manipulation of the respective clamp assemblies for securing the fender assemblies to the bicycle.

Although each adjustable fender support assembly is shown as providing a pair of radial support assemblies that generally flank the respective wheel, it is appreciated that either of front fender assembly 12 or rear fender assembly 14 could be provided with an adjustable support assembly on only one lateral side of the respective wheel. It is further appreciated that either of front fender assembly 12 or rear fender assembly 14 could be provided with one or more adjustable fender support assemblies as disclosed herein.

Therefore, one embodiment of the invention includes a bicycle fender assembly having a fender body that is shaped to be positioned radially outward and circumferentially about a portion of a bicycle wheel. A strut is attached to the fender and is oriented to extend in a radially inward direction from the fender body. A mount arm is removably secured to a bicycle and is oriented to bypass the strut. The fender assembly includes a clamp body having a first portion and a second portion. The first portion of the clamp body extends along a first side of the mount arm and the strut and the second portion of the clamp body extends along a second side of the mount arm and the strut so as to be opposite the first portion. The assembly includes a fastener having a head portion that passes through one of the first portion and the second portion of the clamp body and a shaft portion that operatively engages the other of the first portion and the second portion of the clamp assembly. Tightening of the fastener captures the strut and the mount arm between one of the first portion and the second portion of the clamp body and the head of the fastener and fixes a radial position of the fender body with respect to the bicycle wheel.

In a preferred embodiment, a fender assembly includes more than one strap and mount arm association and a clamp assembly engaged with the overlapping ends of the strap assembly and more than one mount arm.

Another embodiment of the invention usable with one of more of the aspects of the above embodiment includes a bicycle fender assembly having a strap attached to the fender. The strap has a first end and a second end that extend in an inward radial direction from opposite lateral sides of the fender. A first mount shaft and a second mount shaft, that each include a first end secured to a bicycle so that the mount shafts flank a wheel, extend in an outward radial direction toward the strap so that the first mount shaft overlaps the first end of the strap and the second mount shaft overlaps the second end of the strap. A first clamp assembly is engaged with the first mount shaft and the strap and a second clamp assembly is engaged with the second mount shaft and the strap. Each clamp assembly is adjustable so that the respective mount shaft and strap can bypass one another when the clamp assembly is loose and fix a position of the strap relative to the respective mount shaft when the clamp assembly is tightened.

Another embodiment of the invention usable with one or more of the aspects above includes a method of mounting a fender relative to a bicycle wheel. The method includes positioning a mount arm along alternate ends of a strap attached to a fender. A clamp is engaged with each mount arm and the strap so that each mount arm and strap are loosely attached to one another and can bypass one another in a direction generally aligned with a longitudinal axis of the strap and the respective mount arm. The distal end of each mount arm is secured to alternate sides of a bicycle so that the mount arms and at least a portion of the alternate ends of the strap flank the bicycle wheel. The fender is positioned in a radial direction relative to the wheel thereby altering an overlap length of the strap and the respective mount arm and the clamp is adjusted to compress the strap and the respective mount arm thereby defining the overlap length with the fender in a desired position about the bicycle wheel.

The present invention has been described in terms of the preferred embodiment, and it is recognized that equivalents, alternatives, and modifications, aside from those expressly stated, are possible and within the scope of the appending claims. It is further appreciated that the respective features of any one of the embodiments discussed above is not necessarily solely exclusive thereto.

What is claimed is:

1. A bicycle fender assembly comprising:
   a fender body shaped to be positioned radially outward and circumferentially about a bicycle wheel;
   a strut attached to the fender and oriented to extend in a radially inward direction from the fender body;
   a mount arm removably secured to a bicycle;
   a clamp body having a first portion that extends along a first side of the mount arm and the strut and a second portion that extends along a second side of the mount arm and the strut opposite the first portion; and
   a fastener that passes through one of the first portion and the second portion of the clamp body and operatively engages the other of the first portion and the second portion so that tightening the fastener captures the strut and the mount arm relative to the first portion and the second portion of the clamp body and fixes a radial position of the fender body with respect to the bicycle wheel.

2. The bicycle fender assembly of claim 1 further comprising another clamp body engaged with the strut and the mount arm and offset along a longitudinal axis of the strut and the mount arm from the first clamp body.

3. The bicycle fender assembly of claim 2 wherein the clamp body is engaged with an end of one of the strut and the mount arm and the another clamp body is engaged with an end of the other of the strut and the mount arm.

4. The bicycle fender assembly of claim 1 wherein the strut includes a first section and a second section that extend in a radial direction along opposite lateral sides of the bicycle wheel.

5. The bicycle fender assembly of claim 4 wherein the mount arm is engaged with the first section of the strut and the assembly further comprises another mount arm engaged with the second section of the strut so that each mount arm is bypassingly engaged with one of the first section and the second section of the strut.

6. The bicycle fender assembly of claim 1 wherein the bicycle wheel is at least one of a front wheel and a rear wheel of a bicycle.

7. A bicycle fender assembly comprising:
   a strap attached to a fender, the strap having a first end and a second end that extend in an inward radial direction from opposite lateral sides of the fender;
   a first mount shaft and a second mount shaft wherein each mount shaft includes a first end secured to a bicycle so that the mount shafts flank a wheel and each mount shaft extends in an outward radial direction toward the strap so that the first mount shaft overlaps the first end of the strap and the second mount shaft overlaps the second end of the strap; and
   a first clamp assembly engaged with the first mount shaft and the strap and a second clamp assembly engaged with the second mount shaft and the strap, each clamp assembly being adjustable so that the respective mount shaft and strap can bypass one another when the clamp assembly is loose and fix a position of the strap relative to the respective mount shaft when the clamp assembly is tightened.

8. The bicycle fender assembly of claim 7 further comprising a third clamp assembly engaged with the first mount shaft and the strap and a fourth clamp assembly engaged with the second mount shaft and the strap.

9. The bicycle fender assembly of claim 8 wherein the first clamp assembly engages a second end of the first mount shaft and is positionable along the strap, the second clamp assembly engages a second end of the second mount shaft and is positionable along of the strap, the third clamp assembly engages the first end of the strap and is positionable along a length of the first mount shaft, and the fourth clamp assembly engages the second end of the strap and is positionable along a length of the second mount shaft.

10. The bicycle fender assembly of claim 9 further comprising a bend formed on at least one of the end of each of the first end and second end of the strap and the second end of each of the first mount shaft and the second mount shaft and configured to be captured by the respective clamp assembly.

11. The bicycle fender assembly of claim 7 further comprising another strap and third and fourth mount shafts that are radially offset from the strap and first and second mount shafts.

12. The bicycle fender assembly of claim 7 further comprising a tang that is attached to the fender and extends in a radially outward direction for directly engaging the bicycle.

13. The bicycle fender assembly of claim 7 further comprising a deflector that extends in a circumferential direction from the fender.

14. The bicycle fender assembly of claim 7 wherein each clamp assembly includes a first portion and a second portion that are inseparable and positioned on generally opposite lateral sides of the strap and respective mount shaft.

15. The bicycle fender assembly of claim 14 wherein each clamp assembly further comprising a fastener having a head that passes through one of the first portion and the second portion and a shaft portion that passes between the strap and the respective mount shaft.

16. A method of mounting a fender relative to a bicycle wheel comprising:
    positioning a mount arm along alternate ends of a strap attached to a fender;
    engaging a clamp with each mount arm and the strap so that each mount arm and strap are loosely attached to one another and can bypass one another in a direction generally aligned with a longitudinal axis of the strap and the respective mount arm;
    securing a distal end of each mount arm to alternate sides of a bicycle so that the mount arms and at least a portion of the alternate ends of the strap flank the bicycle wheel;
    positioning the fender in a radial direction thereby altering an overlap length of the strap and the respective mount arm; and
    adjusting the clamp to compress about the strap and the respective mount arm and thereby defining the overlap length with the fender in a desired position about the bicycle wheel.

17. The method of claim 16 wherein adjusting the clamp further comprising compressing the strap and the respective mount arm confined therebetween into a sidewall of the clamp.

18. The method of claim 17 further comprising engaging a fastener with the clamp and orienting a driven end of the fastener in an outward direction so that translation of the fastener in an inward direction compresses the mount arm and the strap between the clamp and a head portion of the fastener.

19. The method of claim 16 further comprising engaging a clamp with an end of the respective mount arm and the strap so that the respective mount arm and strap extends only from one side of the clamp.

20. The method of claim 16 further comprising engaging another strap with the fender wherein the another strap is engaged by another clamp that cooperates with another mount arm securable to the bicycle.

* * * * *